United States Patent [19]

Poupel et al.

[11] 4,308,600
[45] Dec. 29, 1981

[54] METHOD AND APPARATUS FOR DETERMINING THE POSITION OF A MOBILE APPARATUS ON AN IMMERSED STRUCTURE

[75] Inventors: Pierre Poupel, Le Havre; Patrick Le Rolland; Alain Faure, both of Montivilliers, all of France

[73] Assignee: Sotraplex S.A., Le Havre, France

[21] Appl. No.: 140,607

[22] Filed: Apr. 15, 1980

[51] Int. Cl.³ .................... G01S 15/42; G01S 15/88
[52] U.S. Cl. ................................ 367/96; 367/117; 367/127
[58] Field of Search ............... 367/96, 99, 117, 118, 367/127

[56] References Cited

U.S. PATENT DOCUMENTS

| | | | |
|---|---|---|---|
| 3,222,634 | 12/1965 | Foster | 367/127 X |
| 3,336,572 | 8/1967 | Paull et al. | 367/117 |
| 3,383,651 | 5/1968 | Koblick | 367/127 |
| 3,757,285 | 9/1973 | Ferré | 367/96 X |
| 3,792,424 | 2/1974 | Nakatsuji et al. | 367/117 |

FOREIGN PATENT DOCUMENTS 2373054  6/1978  France.

OTHER PUBLICATIONS

*Marine Week*, "In Water Hull Inspection by Robot Scanner," p. 29, vol. 11, No. 25, Oct. 1974.
Talkington, H. R., Navy Tech. *Disclosure Bull.,* "Remotely Operated Hull Inspection Vehicle", vol. 1, No. 1, May 1976, pp. 71-76.

*Primary Examiner*—Richard A. Farley
*Attorney, Agent, or Firm*—Charles E. Brown

[57] ABSTRACT

The invention relates to the determination of the position of a self-contained operating apparatus movable along any line of displacement over any immersed structure.

A follower apparatus is associated with the operating apparatus, and the position of this follower apparatus, along a line of displacement chosen as the reference line, is determined at any instant. The follower apparatus is displaced by the operating apparatus by servocontrol means, and at any instant the transverse distance between the operating apparatus and the follower apparatus is monitored.

23 Claims, 9 Drawing Figures

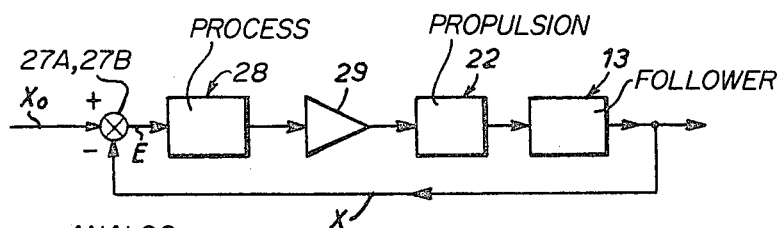
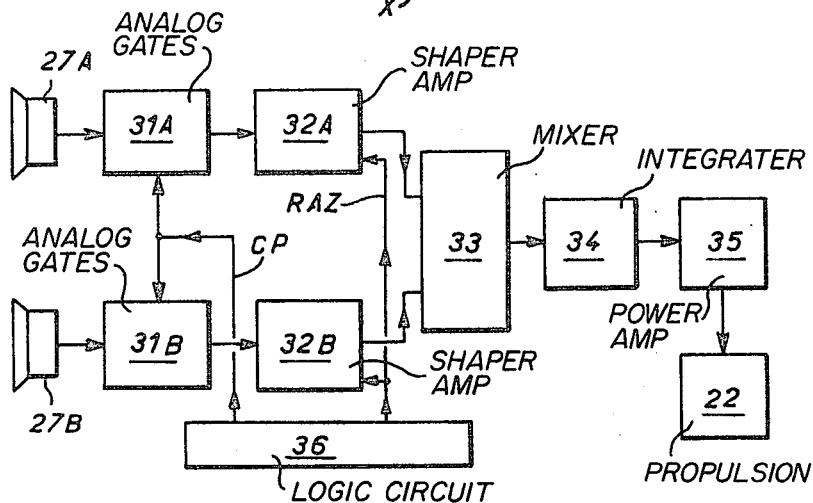
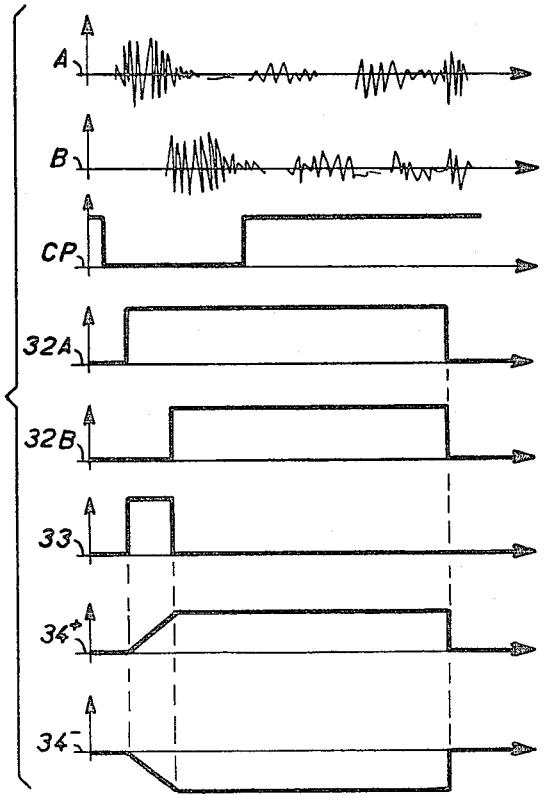

METHOD AND APPARATUS FOR DETERMINING THE POSITION OF A MOBILE APPARATUS ON AN IMMERSED STRUCTURE

The present invention relates to the determination of the position of a self-contained apparatus, hereinafter referred to as an operating apparatus, which is arranged to move over an immersed structure, for example, the hull of a ship in order to inspect the said hull.

As is known, the issuing and renewal of certificates of seaworthiness for ships is subject to a rigorous inspection of the hull of the ship in which certain characteristics are checked at every point on the hull. In particular, the condition of the protective coating of the hull is checked, as is the extent of corrosion, the nature and amplitude of any deformations in the metal plate of the hull, for example caused by running aground, and the thickness of the metal plate.

Generally, these checks are carried out in dry dock and the experts of the official bodies authorised to carry out these checks meticulously inspect, square meter by square meter, the hulls of ships which are submitted for inspection.

This constitutes a considerable obligation which greatly increases the costs of maintaining a ship.

This disadvantage is accentuated in the case of high-tonnage ships, whether these be, for example, oil tankers, ore carriers or container ships, because the sizes of dry docks are becoming less and less compatible with the gigantic size of such ships, because the large commercial ports, with a dry dock, which are capable of accepting the ships are ill-equipped, and because of the actual cost of taking the ships out of service.

French patent application No. 76/36,434 proposed a process, an installation and a carriage which made it possible to overcome these disadvantages.

The carriage described in this French patent application is capable of moving on the surface of the immersed structure to be inspected, and it carries a sensor, for example a television camera, which is connected in a closed circuit to a receiver located on the surface, and which is suitable for producing, on this receiver, an image of the surface which it is scanning.

It is thus possible to carry out, on land, the multiple checks to which the hull of a ship must be subjected, whilst the ship is itself afloat and hence without submitting it to the costly dry dock procedure.

However, for the inspection carried out in this way to be suitably rigorous, the position of the carriage or operating apparatus used, on the surface over which it is moving, must be determined very exactly at any instant, in particular in order to make it possible, for example, to make a comparison between the recordings made by the sensor, carried by the apparatus, during successive statutory surveys.

The present invention relates to a method and an apparatus for carrying out this position determination.

According to the present invention there is provided a method of determining the position of an operating apparatus arranged to move over an immersed structure along any line of displacement, wherein a follower apparatus is associated with said operating apparatus and is movable along a line of displacement chosen as the reference line, the method comprising determining at any instant the longitudinal position of said follower apparatus along said reference line, establishing a relative servo-control for displacing the operating apparatus and the follower apparatus along their respective lines of displacement, and monitoring the transverse distance between the said apparatuses at any instant.

Thus, at any instant, the operating apparatus is localised in a system of overall rectangular coordinates, the reference line of displacement of the follower apparatus forming, for example, the abscissa axis of this system, and the transverse distance between the apparatuses in question providing, at any instant, the corresponding ordinate of the operating apparatus.

The present invention also extends to an apparatus for determining the position of an operating apparatus which is movable over an immersed structure along any line of displacement, the apparatus comprising a follower apparatus which is movable along a line of displacement chosen as the reference line, detection means for recording the longitudinal position of the follower apparatus on the reference line, servo-control means for linking the displacement of the follower apparatus and of the operating apparatus along their respective lines of displacement, and detection means for recording the transverse distance between the operating apparatus and the follower apparatus.

Embodiments of the present invention will hereinafter be described, by way of example, with reference to the accompanying drawings, in which:

FIG. 5 shows diagrammatically a servo-control between the operating apparatus and the follower apparatus;

FIG. 6 shows a more detailed block diagram of the servo-control;

FIG. 7 is a graph showing the signals of this servo-control;

FIG. 1 illustrates the application of the present invention to a method of inspecting the surface of the hull of a ship which is assumed to be afloat.

In accordance with the method described, for example, in the abovementioned French patent application No. 76/36,434, this inspection is carried out using a carriage or operating apparatus 10 which is capable of moving over the surface to be inspected and which carries a sensor suitable for the inspection to be carried out.

This carriage or operating apparatus does not form part of the present invention and it will not therefore be described in detail herein.

For clarity, only those elements which are necessary for putting the invention into effect will be described.

In the embodiment illustrated, the operating apparatus 10 is arranged to inspect the surface of the bottom 11 of the ship.

However, it is self-evident that it could also be arranged to inspect the surface of either of the sides 12 of this ship.

In each case, a follower apparatus 13 is associated with the operating apparatus 10. The follower apparatus 13 is caused to move along a line of displacement which is chosen as the reference line.

Figure 1:
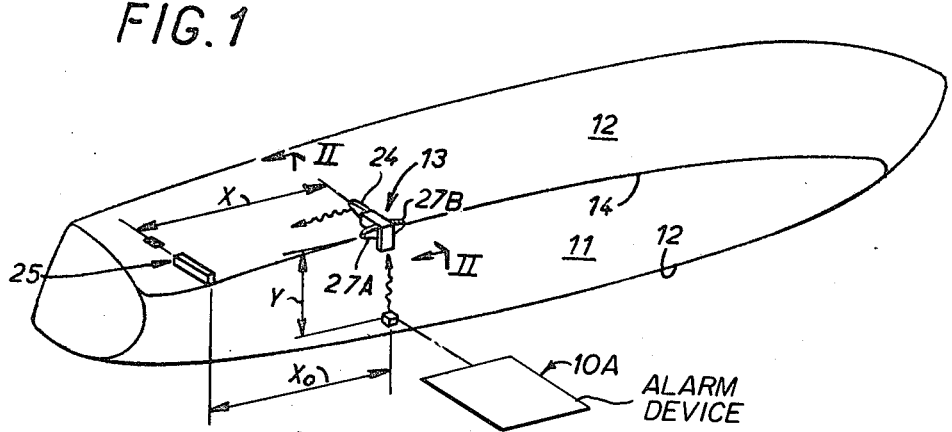
FIG. 1 is a perspective view of a ship, seen obliquely from underneath, showing an operating apparatus and an associated follower apparatus applied thereto.
Figure 2:
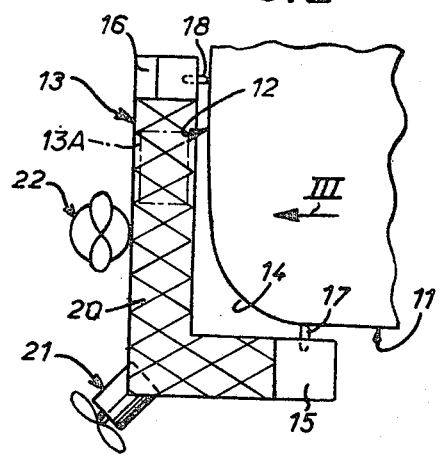
FIG. 2 is a view, on a larger scale, in transverse section along the line II—II of FIG. 1, showing the follower apparatus in greater detail.

In the embodiment illustrated, the intersection between the bottom 11 of the ship and one of its sides 12 is chosen as the reference line, it being assumed that this intersection constitutes an edge 14 as marked in FIG. 1. In reality, and as illustrated in FIG. 2, there is a large curved surface between a side 12 and the bottom 11 and the centre line of this curved surface is assumed to constitute the edge 14.

In this situation, the follower apparatus 13 is arranged to be applied simultaneously to the two surfaces of displacement which are constituted by the bottom 11 and a respective side 12 of the ship.

These two surfaces of displacement form between them a dihedron, and in practice an essentially right-angled dihedron. The follower apparatus 13 has an overall configuration viewed in side elevation, as shown in FIG. 2, of a complementary dihedron and hence, in practice, an L-shaped configuration.

For example, and as illustrated, this follower apparatus 13 may comprise two parallel longitudinal beams 15, 16 transversely connected by a central lattice beam 20 having an L-shaped configuration in side elevation. The beams 15, 16 carry rollers 17, 18 by means of which they are arranged to bear on the bottom 11 or on the side 12 of the ship respectively.

The detailed construction of this follower apparatus 13 is not described herein as it does not form part of the present invention and as it can readily be determined by those skilled in the art.

It is sufficient to point out that this follower apparatus 13 possesses an auxiliary application engine 21 carried obliquely, along its dihedron, by the lattice beam 20, and main propulsion means 22 carried transversely by the said beam, parallel to the longitudinal beams 15, 16.

In the embodiment illustrated, the propulsion means 22 consists of a single engine having two directions of rotation, a propeller being fixed to each end of the engine shaft and arranged such that the effects of both propellers are combined.

As an alternative, the propulsion means may comprise two separate engines, each individually controlling one propeller, there being one propeller for a first direction of propulsion and another for the opposite direction of propulsion.

The operating apparatus 10 is assumed to move over the bottom 11 of the ship along any line of displacement. The device for determining the position of the operating apparatus on the bottom 11 at any instant comprises, in addition to the follower apparatus 13, detection means for recording the longitudinal position of the follower apparatus along its line of displacement which is the reference line 14, relative servo-control means arranged to link the displacement of the follower apparatus 13 and of the operating apparatus 10 along their respective lines of displacement, and detection means for recording the transverse distance between the operating apparatus 10 and the follower apparatus 13.

Figure 3:
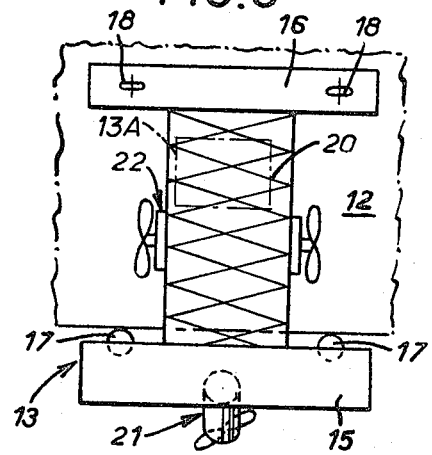
FIG. 3 is an elevated view of the follower apparatus taken along the arrow III of FIG. 2.
Figure 4:
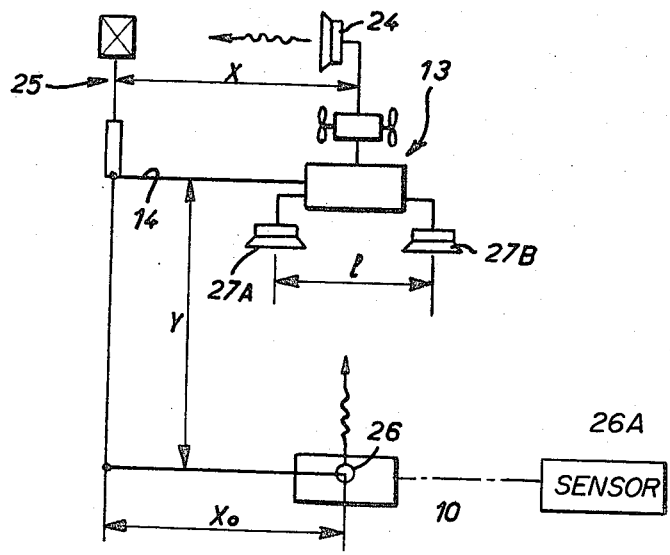
FIG. 4 is a block diagram illustrating the use of the operating apparatus and the follower apparatus.

In fact, as illustrated in FIGS. 1 and 3, the position of the operating apparatus 10 can be located at any instant using a system of axes of rectangular coordinates, the reference line 14 forming the abscissa of this system. The follower apparatus 13 is systematically kept at right-angles to the operating apparatus 10 as is described below. Thus, the position X of the follower apparatus 13 on the reference line 14, determined relative to any point chosen as the origin on this reference line, provides the abscissa $X_o$ of the position of the operating apparatus 10 at any instant. Furthermore, the transverse distance of the operating apparatus 10 from the follower apparatus 13 provides the ordinate Y of the position of the operating apparatus 10.

In the embodiment illustrated, the detection means for recording the longitudinal position of the follower apparatus 13 on the reference line 14 comprises an ultrasonic transducer 24 carried by the follower apparatus 13 and set up as a transmitter-receiver, and a reflector 25 carried by the ship. This reflector 25, which is a three-plane reflector for example, is preferably placed at that point on the line of displacement 14 which is chosen as the origin, and is orientated such that the ultrasonic pulses emitted by the transducer 24 are reflected back towards the transducer 24.

In a manner which is in itself known, the abscissa X of the follower apparatus 13 at any time can be determined from the total propagation time of these ultrasonic pulses in both directions. The ultrasonic pulses are preferably emitted in the form of bursts of sine waves.

The servo-control means employed for linking the displacement of the follower apparatus 13 and of the operating apparatus 10 along their respective lines of displacement comprises, in the embodiment illustrated, an ultrasonic transducer 26 carried by the operating apparatus 10 and arranged as a transmitter. In practice, for reasons which will become apparent below, the transducer 26 is also arranged as a receiver. The servo-control means also comprises two ultrasonic transducers 27A, 27B, which are mounted as a dipole on the follower apparatus 13, parallel to the line of displacement 14, and each arranged as a receiver.

In the embodiment illustrated, it is the follower apparatus 13 which is servo-controlled, for displacement or tracking, by the operating apparatus 10.

When the follower apparatus 13 is exactly at right-angles to the operating apparatus 10, its transducers 27A, 27B simultaneously receive the sound pulses emitted by the transducer 26 of the operating apparatus 10.

On the other hand, if the follower apparatus 13 is ahead of, or behind, the operating apparatus 10, there is necessarily a difference in the arrival time, or level, of the signals or sound pulses received by the transducers 27A, 27B of this follower apparatus from the transducer 26 of the operating apparatus 10.

It is this difference which is utilised for governing an electromechanical servo-control line shown schematically in FIG. 5. The dipole, formed by the transducers 27A, 27B of the follower apparatus 13, constitutes the input sensor to the servo-control line of FIG. 5.

In the arrangement of FIG. 5 it is assumed that the dipole formed by the transducers 27A, 27B receives the abscissa $X_o$ of the operating apparatus 10 at a given instant and the abscissa X of the follower apparatus 13 at the same instant, such that the separation E between these abscissae can be calculated.

This separation, which is processed at 28 and amplified at 29, is applied to the propulsion engine 22 of the follower apparatus 13; the value of the abscissa X of the latter consequently changes and this new value is then applied in turn to the input sensor formed by the transducers 27A, 27B of this follower apparatus 13.

Generally, the propulsion means 22 fitted to the follower apparatus 13 is governed by control means which are sensitive to the difference in the arrival time or level of the signals received by the receiving transducers carried by this follower apparatus.

FIGS. 6 to 9 illustrate practical embodiments which are suitable for such a servo-control, in the case where the difference under consideration is a difference in arrival time.

As illustrated by the block diagram of FIG. 6, the signals received by the transducers 27A, 27B of the follower apparatus 13 are fed, by way of an analog gate 31A, 31B, and a respective shaper amplifier 32A, 32B, to a mixing device 33. The output of the device 33 is then fed to an integrator 34 and then to a power amplifier 35, the output of which controls the propulsion means 22 of the follower apparatus 13.

The analog gates 31A, 31B are controlled by a common control logic circuit 36 such that, for each sound pulse emitted by the transducer 26 of the operating apparatus 10, only the first of the sound pulses arriving at the transducer 27A, 27B of the follower apparatus 13 is taken into account.

In a manner known to those skilled in the art, this control logic circuit 36 is arranged to supply a fixed rectangular enabling pulse CP to the analog gates 31A, 31B. It is also arranged to supply a zero reset pulse RAZ to the shaper amplifiers 32A, 32B.

FIG. 7 shows the form of the signals of the arrangement of FIG. 6, the unit of amplitude being arbitrary.

In FIG. 7, the graphs A and B schematically represent the signals received by the transducers 27A, 27B and transmitted by the latter to the analog gates 31A, 31B. CP schematically represents the rectangular enabling pulse applied to the analog gates 31A, 31B. 32A, 32B schematically represent the output voltages of the shaper amplifiers 32A, 32B. The graph line 33 represents the output voltage of the mixing device 33, and the graphs 34+ and 34− respectively represent the output voltage of the integrator 34 according to whether the difference in the arrival time of the signals received by the transducers 27A, 27B has a positive or negative sign.

The output voltage of the integrator 34 is proportional to the time difference irrespective of whether this difference is positive or negative.

The propulsion means 22 of the follower apparatus 13 is thus controlled in dependence upon the time difference and, by reducing this time difference to zero, it causes the follower apparatus 13 to follow the operating apparatus 10 at any instant. Thus, the abscissa X of the follower apparatus, which is determined as described above, is now equal to the abscissa $X_o$ of the operating apparatus, and the abscissa $X_o$ is thus known from the value of the abscissa X.

The practical construction of an arrangement such as that shown in FIG. 6 may be one of several embodiments as is known to those skilled in the art.

Figure 8:
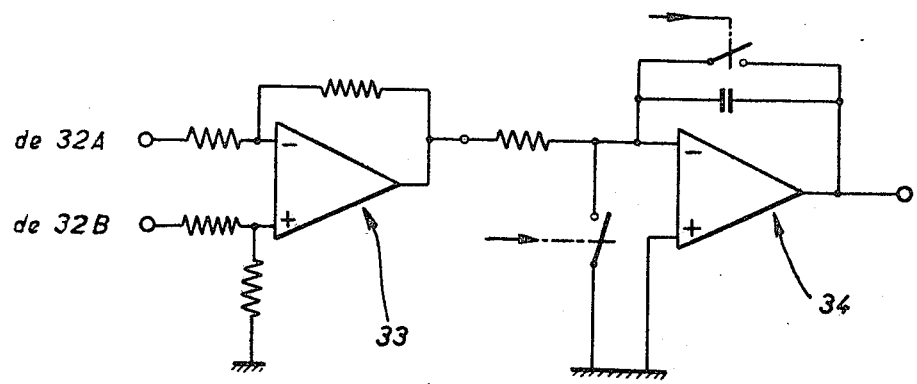
FIG. 8 shows a circuit diagram of an embodiment of one of the components in the servo-control line.

For example, the mixing device 33 and the integrator 34 may be an analog construction as illustrated in FIG. 8; in this embodiment an operational amplifier arranged to subtract the input signals constitutes the mixing device 33, whilst an operational amplifier arranged as an integrator constitutes the integrator 34.

Figure 9:
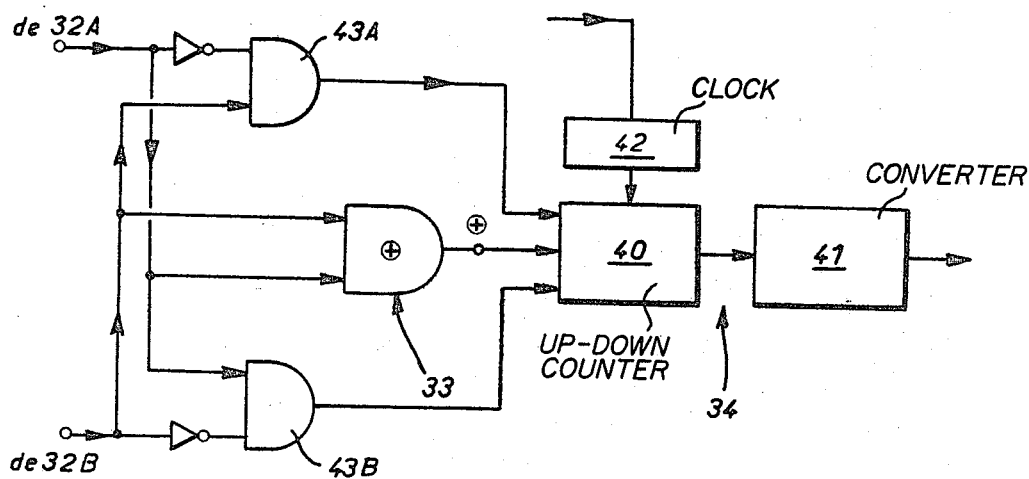
FIG. 9 shows a circuit diagram of an alternate embodiment of the component of the servo-control line.

In a further embodiment illustrated in FIG. 9, a digital construction is possible; the mixing device 33 comprises an analog gate, and the integrator 34 comprises an up/down counter 40 and a digital-analog converter 41, the up/down counter 40 being controlled by a clock 42 and by analog gates 43A, 43B individually receiving the output voltages of the shaper amplifiers 32A, 32B.

As such arrangements can readily be determined by those skilled in the art, they will not be described in greater detail herein.

In all cases, the electromechanical servo-control line used determines the direction of rotation of the propulsion means 22 of the follower apparatus 13 so that the direction of displacement of the latter reduces to zero the difference which forms the input element thereof, as described above.

If the propulsion means 22 is a hydraulic motor, relays are employed as are customary in this field.

In order to provide detection means capable of determining the transverse distance Y between the operating apparatus 10 and the follower apparatus 13, the transducer 26 mounted on the operating apparatus 10 acts as both a transmitter and a receiver, so that it receives the echo of its own sound pulses, between two emissions, and thus determines the desired transverse distance Y.

Preferably, the separation between the transducers 27A, 27B of the follower apparatus 13 can be adjusted.

Thus, the separation l between these transducers can advantageously be adjusted so as to give the optimum detection conditions, taking into account the transverse distance between the operating apparatus 10 and the follower apparatus 13; this adjustment can be automatic.

In practice, parallel lines, for example straight lines, are chosen as the lines of displacement of the operating apparatus 10 and of the follower apparatus 13. Thus, the transverse distance Y between the operating apparatus 10 and the follower apparatus 13 is kept constant over the whole length of one longitudinal displacement of this operating apparatus. This transverse distance is altered from one longitudinal displacement of the operating apparatus 10 to another.

In a manner known to those skilled in the art, the transducer 26 of the operating apparatus 10 may be of the rotary type and servo-controlled by way of a sensor 26A, for example a gyrometer, which is arranged to keep the active face of the transducer facing the follower apparatus 13.

However, it can happen that, during an inspection operation, the operating apparatus 10 loses contact with the follower apparatus 13, in particular if the ultrasonic pulses passing between these apparatuses must traverse a zone of turbulence, for example a zone of turbulence caused by a water outlet.

It is then possible to cause the operating apparatus 10 systematically to describe a translational movement, parallel to the reference line 14 on which the follower apparatus 13 is located; in fact, the operating apparatus 10 is then inevitably at right-angles to the follower apparatus 13 at a given instant, and the tracking of the operating apparatus 10 by the latter can resume.

However, this procedure requires a considerable search time.

In order to reduce this search time, the transducer 26 of the operating apparatus 10 preferably has a toroidal directional pattern and is capable of emitting omnidirectional waves in the plane, the transducers 27A, 27B of the follower apparatus 13 being conjointly mounted so that they are each rotatable.

If a loss of contact occurs, these transducers 27A, 27B automatically start to rotate about their axis, in order to search for the operating apparatus 10. After contact has been resumed, the follower apparatus 13 is automatically brought back to a position at right-angles to the operating apparatus 10 with the aid of appropriate servo-control lines.

In all cases, the operating apparatus 10 may be provided with an acoustic or visual alarm means 10A, which is not shown in the drawings, which is actuated on loss of contact and thus signals this loss of contact to the apparatus servo-controlled by this operating apparatus.

The alarm means is controlled, for example, by the detection and/or servo-control means acting between the operating apparatus and the follower apparatus.

The follower apparatus 13 may constitute a relay for receiving energy and for returning signals to the surface.

Thus, the operating apparatus 10 only requires a moderately sized linkage, in the form of cables and/or tubes, with the follower apparatus 13, and this considerably limits the drag stresses to which this operating apparatus is subjected because of this linkage, and thus renders the said operating apparatus more manoeuvrable.

The follower apparatus houses the bulk of the linkage, in the form of cables and/or tubes, which is necessary for the surface connections, but this has no repercussions on the operating apparatus 10.

Likewise, the follower apparatus 13 can advantageously comprise a hydraulic power system 13A capable of serving the operating apparatus 10.

Of course, the present invention is not limited to the embodiments which have been described and shown, but encompasses any modified embodiment.

For example, the lines along which the operating apparatus and/or the follower apparatus move do not have to be straight; on the contrary, curved lines could also be used.

Likewise, these lines do not have to be parallel to one another; in fact, it suffices to record the transverse distance between apparatuses at any instant.

Furthermore, as regards the inspection of the hull of a ship, it is also not necessary for the reference line, along which the follower apparatus according to the invention is to move, to be a bottom/side edge of this hull.

Other reference lines can be envisaged.

For example, a cable can be stretched between two terminals set up at a distance from one another.

Likewise, a slide can be attached to the hull which is to be inspected, for example using magnetic fixing means.

A slide of this type could also be permanently fixed to this hull from the outset.

In this case, the reference line is physically present.

However, the reference line can also be imaginary, the follower apparatus being directed towards an ultrasonic transmitting beacon and being servo-controlled, for displacement in the corresponding direction, by a dipole of ultrasonic receiving transducers of the type described above.

Thus, the overall configuration of the follower apparatus, in side elevation, does not have to be L-shaped.

On the contrary, it can move flat over the bottom, or one side, of the ship to be inspected.

Moreover, the field of application of the invention is not limited only to the inspection of ships, it also covers the inspection of any immersed structure.

In more general terms, the invention can be used to determine the position of any operating apparatus which is to move over any immersed structure, irrespective of the function which this operating apparatus is to perform.

Thus, instead of an inspection function, the operating apparatus may be used, for example, for treating cleaning and/or painting the structure.

Furthermore, the process described above may be completely automated.

In this case, it would only be necessary for a diver to observe the operating apparatus.

This operating apparatus would then be manoeuvred from the surface, using a control console, it being possible for the path along which the operating apparatus moves to be displayed on a plotting board for example, and for its position to be determined, as above, with the aid of the follower apparatus according to the invention.

We claim:

1. A method of determining the position of an operating apparatus arranged to move over an immersed structure along any line of displacement, wherein a follower apparatus is associated with said operating apparatus and is movable along a line of displacement chosen as the reference line, the method comprising determining at any instant the longitudinal position of said follower apparatus along said reference line, establishing a relative servo-control for displacing the operating apparatus and the follower apparatus along their respective lines of displacement, and monitoring the transverse distance between the said apparatuses at any instant.

2. A method according to claim 1, wherein the follower apparatus is servo-controlled for displacement by the operating apparatus.

3. A method according to claim 2, wherein for the servo-control of the follower apparatus by the operating apparatus, an ultrasonic transmitting transducer is provided on the operating apparatus, and two ultrasonic receiving transducers, which are mounted as a dipole are provided on the follower apparatus parallel to the reference line, and wherein the possible difference in the arrival time of the signals received by the said receiving transducers from said transmitting transducer is monitored, the displacement of the follower apparatus, in one or other direction, is controlled in dependence upon said difference.

4. A method according to claim 2, wherein for the servo-control of the follower apparatus by the operating apparatus, an ultrasonic transmitting transducer is provided on the operating apparatus, and two ultrasonic receiving transducers, which are mounted as a dipole are provided on the follower apparatus parallel to the reference line, and wherein the possible difference in the arrival time of the signals received by the said receiving transducers from said transmitting transducer is monitored, the displacement of the follower apparatus, in one or other direction, is controlled in dependence upon said difference.

5. A method according to claim 3 or 4, wherein in order to measure the transverse distance between the apparatuses, the transducer provided on the operating apparatus also acts as a receiving transducer.

6. A method according to claim 1, wherein in order to determine the longitudinal position of the follower apparatus along the reference line, an ultrasonic transmitter-receiver transducer is provided on the follower apparatus, and a reflector is arranged at a predetermined origin on the reference line, the reflector being arranged to reflect signals emitted by the transmitter-receiver transducer back to said transducer.

7. A method according to claim 1, wherein the immersed structure is the hull of a ship and one of the bottom/side edges of the hull is the reference line along which the follower apparatus is displaced.

8. A method according to claim 7, wherein the follower apparatus has an L-shaped configuration and is arranged to bear both on the bottom of the ship and on one of the sides of the ship.

9. A method according to claim 1, wherein the follower apparatus is a relay for the intake of energy, and the return of signals to the surface.

10. A method according to claim 1, wherein parallel lines, for example straight lines, are chosen as the lines of displacement of the operating apparatus and of the follower apparatus, a constant transverse distance is kept between the operating apparatus and the follower apparatus, and this transverse distance is modified from one longitudinal displacement of the operating apparatus to another.

11. Apparatus for determining the position of an operating apparatus which is movable over an immersed structure along any line of displacement, the apparatus comprising a follower apparatus which is movable along a line of displacement chosen as the reference line, detection means for recording the longitudinal position of the follower apparatus on the reference line, servo-control means for linking the displacement of the follower apparatus and of the operating apparatus along their respective lines of displacement, and detection means for recording the transverse distance between the operating apparatus and the follower apparatus.

12. Apparatus according to claim 11, wherein the detection means for recording the longitudinal position of the follower apparatus on the reference line comprises an ultrasonic transmitting-receiving transducer carried by the follower apparatus, and a reflector carried by the immersed structure, said reflector being arranged at a predetermined origin on the reference line.

13. Apparatus according to claim 10, wherein the servo-control means for linking the displacement of the follower apparatus and of the operating apparatus along their respective lines of displacement comprises an ultrasonic transmitting transducer carried by the operating apparatus, two ultrasonic receiving transducers arranged as a dipole on the follower apparatus, parallel to its line of displacement, and propulsion means for the follower apparatus, said propulsion means being controlled by control means which are responsive to the possible difference in the arrival time of the signals received by the said receiving transducers from said transmitting transducer.

14. Apparatus according to claim 13, wherein the separation between the receiving transducers of the follower apparatus is of the adjustable type.

15. Apparatus according to claim 13 or 14, wherein said receiving transducers are of the rotary type.

16. Apparatus according to claim 11, wherein the servo-control means for linking the displacement of the follower apparatus and of the operating apparatus along their respective lines of displacement comprises an ultrasonic transmitting transducer carried by the operating apparatus, two ultrasonic receiving transducers arranged as a dipole on the follower apparatus, parallel to its line of displacement, and propulsion means for the follower apparatus, said propulsion means being controlled by control means which are responsive to the possible difference in the level of the signals received by said receiving transducers from the transmitting transducer.

17. Apparatus according to claim 12, wherein said follower apparatus has a hydraulic power system.

18. Apparatus according to claim 13 or 16, wherein the transmitting transducer of the operating apparatus has a toroidal directional pattern and is arranged to emit omnidirectional waves in the plane.

19. Apparatus according to claim 13 or 16, wherein the transmitting transducer of the operating apparatus is of the rotary type and is servo-controlled for positioning by a sensor, such as a gyrometer.

20. Apparatus according to claim 13 or 16, wherein for providing detection means for recording the transverse distance between the operating apparatus and the follower apparatus, the transducer carried by the operating apparatus is not only a transmitting transducer but also a receiving transducer.

21. Apparatus according to claim 11, further comprising an acoustic or visual alarm means mounted on the operating apparatus and controlled by the detection means and/or by the servo-control means.

22. Apparatus according to claim 11, wherein the follower apparatus constitutes a relay for the intake of energy and the return of signals to the surface, and is optionally equipped with a hydraulic power system.

23. Apparatus according to claim 11, wherein the follower apparatus has the overall configuration of a dihedron, for example an L-shaped configuration, so that it is suitable for two surfaces of displacement which themselves form a dihedron.

* * * * *